United States Patent
Redmond, Jr.

(10) Patent No.: US 12,007,206 B2
(45) Date of Patent: Jun. 11, 2024

(54) MODULAR MAN-PORTABLE DRONE BARRIER

(71) Applicant: Robert F. Redmond, Jr., Richmond, VA (US)

(72) Inventor: Robert F. Redmond, Jr., Richmond, VA (US)

( * ) Notice: Subject to any disclaimer, the term of this patent is extended or adjusted under 35 U.S.C. 154(b) by 601 days.

(21) Appl. No.: 15/928,318

(22) Filed: Mar. 22, 2018

(65) Prior Publication Data

US 2019/0041170 A1 Feb. 7, 2019

Related U.S. Application Data

(60) Provisional application No. 62/539,608, filed on Aug. 1, 2017.

(51) Int. Cl.
*F41H 11/04* (2006.01)
*B64F 1/02* (2006.01)

(52) U.S. Cl.
CPC ............. *F41H 11/04* (2013.01); *B64F 1/027* (2020.01); *B64F 1/0295* (2020.01)

(58) Field of Classification Search
CPC ........... F41H 11/02; F41H 11/04; F41H 11/05
See application file for complete search history.

(56) References Cited

U.S. PATENT DOCUMENTS

| | | | |
|---|---|---|---|
| 2,170,481 A | * | 8/1939 | Morrison ................ F41H 11/05 114/240 R |
| 2,365,778 A | | 12/1944 | Schwab |
| 2,455,237 A | * | 11/1948 | Davis .................... B60P 7/0876 410/97 |
| 4,465,262 A | | 8/1984 | Itri |
| 4,524,953 A | | 6/1985 | Phillips |
| 4,558,851 A | | 12/1985 | Nakayama |
| 4,576,364 A | | 3/1986 | O'Fearna |
| 4,688,024 A | | 8/1987 | Gadde |
| 4,738,563 A | | 4/1988 | Clark |
| 4,852,194 A | | 8/1989 | Langan |
| 4,896,864 A | | 1/1990 | Nusbaum |

(Continued)

FOREIGN PATENT DOCUMENTS

| | | |
|---|---|---|
| CH | 71208 A | 9/1915 |
| CN | 106767172 A | 5/2017 |

(Continued)

OTHER PUBLICATIONS

International Search Report and Written Opinion for PCT Appl. No. PCT/US2018/042285, Sep. 6, 2018, 11 pages.

*Primary Examiner* — Timothy D Collins
*Assistant Examiner* — Terri L Filosi
(74) *Attorney, Agent, or Firm* — Leading Edge Law Group

(57) ABSTRACT

An aerial vehicle barrier comprises two or more balloons selectively inflatable with a lighter-than-air gas, two or more flexible trunk lines, two or more flexible branch lines, and two or more connecting lines. Each trunk line has a ground-anchorable end and an opposite end attached or selectively attachable to a respective one of the balloons. Each branch line has opposing ends attached or selectively attachable to respective ones of two adjacent trunk lines to span between the two adjacent trunk lines. Each connecting line has opposing ends attached to respective ones of two adjacent branch lines.

6 Claims, 1 Drawing Sheet

(56) References Cited

U.S. PATENT DOCUMENTS

| | | | |
|---|---|---|---|
| 4,979,701 A | 12/1990 | Colarik | |
| 6,604,732 B1 | 8/2003 | Brinker | |
| 6,902,149 B2 | 6/2005 | Piron | |
| 7,377,490 B1 | 5/2008 | Khosravian | |
| 7,641,416 B2 | 1/2010 | Miracle | |
| 7,901,155 B2 | 3/2011 | Metzger | |
| 8,020,836 B2 | 9/2011 | Bishop | |
| 8,038,097 B1 * | 10/2011 | Monson | B64F 1/027 244/110 E |
| 8,118,516 B2 | 2/2012 | Gelfand | |
| 8,453,996 B1 | 6/2013 | Papadopoli | |
| 8,573,565 B1 | 11/2013 | Lyndaker | |
| 8,695,947 B2 | 4/2014 | Bishop | |
| 8,720,361 B2 | 5/2014 | DiBruno, Sr. | |
| 9,228,807 B1 | 1/2016 | Adams | |
| 2008/0001135 A1 | 1/2008 | Dellinger | |
| 2008/0073633 A1 | 3/2008 | Gelfand | |
| 2008/0173854 A1 | 7/2008 | Meaux | |
| 2008/0283809 A1 | 11/2008 | Hoffman, Jr. | |
| 2011/0174922 A1 | 7/2011 | Berman et al. | |
| 2012/0211712 A1 | 8/2012 | Stelzer | |
| 2014/0033907 A1 * | 2/2014 | Martinez | F41H 11/05 89/1.11 |
| 2014/0054527 A1 | 2/2014 | Lyndaker | |
| 2015/0123062 A1 | 5/2015 | Scullion | |
| 2018/0162529 A1 * | 6/2018 | Klein | B64D 1/02 |

FOREIGN PATENT DOCUMENTS

| | | | | |
|---|---|---|---|---|
| EP | 2116674 A2 | 11/2009 | | |
| GB | 538395 A | 8/1941 | | |
| GB | 2538976 A | 12/2017 | | |
| WO | WO-2010133788 A1 * | 11/2010 | | F41H 11/05 |
| WO | 2016170367 A1 | 10/2016 | | |

* cited by examiner

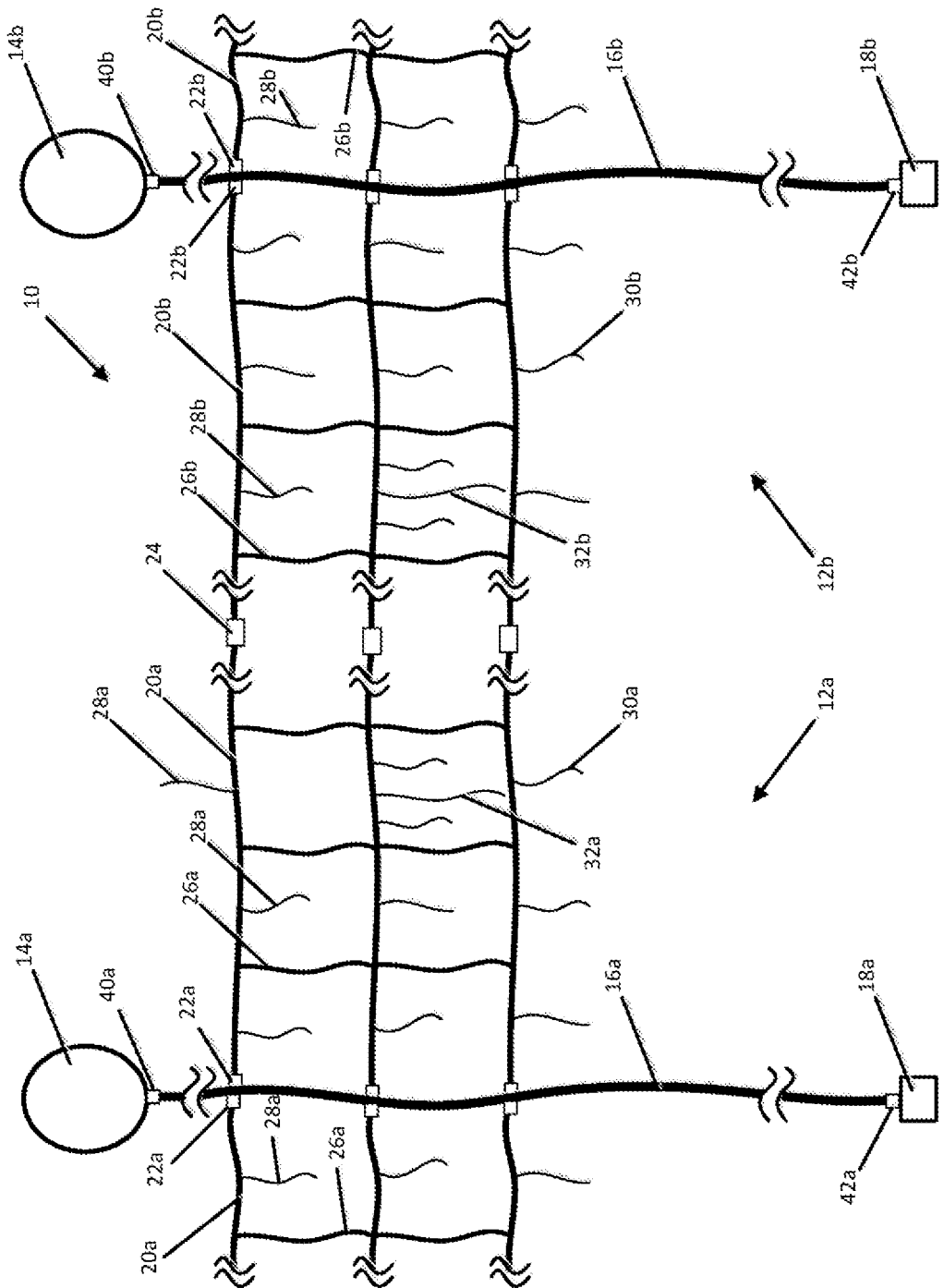

MODULAR MAN-PORTABLE DRONE BARRIER

CROSS-REFERENCE TO RELATED APPLICATIONS

This application claims priority to U.S. Provisional Application Ser. No. 62/539,608, filed Aug. 1, 2017, the contents of which are incorporated herein by reference in its entirety.

FIELD OF THE INVENTION

The present invention relates generally to barriers.

BACKGROUND

An unmanned aerial vehicle (UAV) or drone is an aircraft without a human pilot aboard. Initially developed as large, sophisticated aircraft for use by the military, many drones available today (such as quadcopters) are much smaller and cheaper, and are widely used for civilian purposes by hobbyists and the like.

Unfortunately, the ease of use and wide availability of such civilian drones enables terrorists and other saboteurs to use these drones for nefarious purposes. The drones may be fitted with explosives, or simply flown into critical equipment. Recent military action in the Middle East indicates that terrorist use small drones to distract, threaten, and kill military forces. These events present the need for a simple, man-portable barrier that professional soldiers could quickly and easily construct using few or no tools in combat conditions.

BRIEF SUMMARY OF THE DISCLOSURE

In one embodiment of the invention, an aerial vehicle barrier comprises two or more balloons selectively inflatable with a lighter-than-air gas, two or more flexible trunk lines, two or more flexible branch lines, and two or more connecting lines. Each trunk line has a ground-anchorable end and an opposite end attached or selectively attachable to a respective one of the balloons. Each branch line has opposing ends attached or selectively attachable to respective ones of two adjacent trunk lines to span between the two adjacent trunk lines. Each connecting line has opposing ends attached to respective ones of two adjacent branch lines.

Some or all of the connecting lines may be flexible.

The barrier may further comprise two or more flexible hanging lines, each hanging line having a first end attached to a respective branch line and an opposing unattached end. The two or more flexible hanging lines may comprise flexible hanging lines having two or more different lengths.

Each branch line may comprise first and second branch line portions. Each branch line portion may have a proximal end and a distal end. The proximal end of each branch line portion may be attached or selectively attachable to a respective one of the trunk lines. The distal end of each first branch line portion may be attached or selectively attachable to the distal end of a respective one of the second branch line portions.

In an alternative embodiment of the invention, an aerial vehicle barrier comprises two or more flexible trunk lines, two or more flexible branch lines, two or more connecting lines, and two or more flexible hanging lines. Each trunk line has a first ground-anchorable end and an opposite second end adapted to be supported above a ground surface. Each branch line has opposing ends attached or selectively attachable to respective ones of two adjacent trunk lines to span between the two adjacent trunk lines. Each connecting line has opposing ends attached to respective ones of two adjacent branch lines. Each hanging line has a first end attached to a respective branch line and an opposing unattached end. Some or all of the connecting lines may be flexible.

In another alternative embodiment of the invention, a method of creating a barrier to an aerial vehicle comprises (a) obtaining a barrier device as described herein; (b) anchoring the first end of each of the trunk lines of the barrier device to a ground surface at a desired distance from each adjacent trunk line; and (c) inflating the balloons of the barrier device with a lighter-than-air gas such that the barrier device is lifted upward to a height determined by a length of the trunk lines.

BRIEF DESCRIPTION OF THE SEVERAL VIEWS OF THE DRAWINGS

Reference will now be made to the accompanying drawings, which are not necessarily drawn to scale. The following detailed description of the disclosure will be better understood when read in conjunction with the appended drawings. It should be understood, however, that the disclosure is not limited to the precise arrangements and instrumentalities shown. In the drawings:

FIG. 1 is a simplified side view of a man-portable drone barrier, in accordance with embodiments of the present invention.

DETAILED DESCRIPTION OF THE DISCLOSURE

Certain terminology is used in the following description for convenience only and is not limiting. The words "lower," "bottom," "upper," and "top" designate directions in the drawings to which reference is made. The words "inwardly," "outwardly," "upwardly" and "downwardly" refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Embodiments of the invention are directed to a man-portable drone barrier system comprising modular components that are easily transported to any desired location, quickly assembled with minimal tools, and raised to a desired height via helium balloons (or any other suitable lifting device(s) or method(s)). Once assembled and raised, the system creates a mesh fence in the air to entrap and/or entangle a drone that flies into or near the barrier.

Referring now to FIG. 1, a drone barrier system 10 is illustrated in accordance with embodiments of the invention. Barrier system 10 comprises a first barrier assembly 12a and a second barrier assembly 12b. The first and second barrier assemblies are assembled together as described below to form a complete barrier system. While two barrier assemblies are shown and described herein, more than two assemblies could be assembled together (as described further below) in a modular fashion to form a wider barrier if desired. Each barrier assembly 12a, 12b may be individually and separately packaged for ease and clarity of layout and assembly. The overall weight is low enough and unassembled size of the system is small enough to enable the system to be readily man-portable (i.e. capable of being carried by one person).

The first barrier assembly 12a comprises a main trunk line 16a affixed at one end (via connection point 40a) to a lighter-than-air object, such as a balloon 14a inflated with a lighter-than-air gas such as helium or hydrogen, and at the other end (via connection point 42a) to a securing device 18a for anchoring or securing the assembly 12a to the ground (or to any other suitable fixed object), such as a ground stake, sandbag (or other similar weighted object), clamp, hook, carabiner, tie-off, or the like. The main trunk line 16a may be permanently affixed to the balloon 14a, or may be removably affixed to the balloon 14a such as via a hook on one side and a ring on the other side (or any other suitable mechanism for removable affixation). Similarly, the main trunk line 16a may be permanently affixed to the securing device 18a, or may be removably affixed to the securing device 18a such as via a hook on one side and a ring on the other side (or any other suitable mechanism for removable affixation).

Similarly, the second barrier assembly 12b comprises a main trunk line 16b affixed at one end (via connection point 40b) to a lighter-than-air object, such as a balloon 14b inflated with a lighter-than-air gas such as helium or hydrogen, and at the other end (via connection point 42b) to a securing device 18b for anchoring or securing the assembly 12b to the ground (or to any other suitable fixed object), such as a ground stake, sandbag (or other similar weighted object), clamp, hook, carabiner, tie-off, or the like. The main trunk line 16b may be permanently affixed to the balloon 14b, or may be removably affixed to the balloon 14b such as via a hook on one side and a ring on the other side (or any other suitable mechanism for removable affixation). Similarly, the main trunk line 16b may be permanently affixed to the securing device 18b, or may be removably affixed to the securing device 18b such as via a hook on one side and a ring on the other side (or any other suitable mechanism for removable affixation).

The balloons 14a, 14b may be any suitable, strong, durable material (such as Mylar) that can be inflated as needed with a lighter-than-air gas in a variety of locations and situations and which is large enough to lift each assembly 12a, 12b to the height allowed by the length of each main trunk line 16a, 16b. In alternative embodiments of the invention (not illustrated), the balloons may be replaced with any suitable flying or lifting device, such as hovering drones.

The main trunk lines 16a, 16b may be constructed of any elongated material, such as wire, cable, rope, etc., that is durable, flexible, and strong enough to withstand the upward pull of the balloons and support the branch lines and sub-branch lines (described below), yet light enough to be held aloft by the balloons (along with the other components described below). The material may be braided or monofilament, or any other suitable construction that provides the desired strength-to-weight ratio. The main trunk lines 16a, 16b may be of any suitable, desired length. In one exemplary embodiment of the invention, the main trunk lines 16a, 16b are about 200 feet long. The main trunk lines 16a, 16b may be adapted to attach to the balloons 14a, 14b and the securing devices 18a, 18b only at the ends of the main trunk lines 16a, 16b. Alternatively, the main trunk lines 16a, 16b may be adapted to attach to the balloons 14a, 14b and/or the securing devices 18a, 18b at two or more different locations along the lengths of the main trunk lines 16a, 16b. In this regard, the barrier may be configured to be held aloft at a variety of different heights.

The first barrier assembly 12a further comprises one or more (three are illustrated) branch lines 20a affixed to the left side of the main trunk line 16a in a spaced-apart configuration and one or more (three are illustrated) branch lines 20a affixed to the right side of the main trunk line 16a in a spaced-apart configuration. The left-side branch lines (and sub-branch lines, described below) of the first barrier assembly 12a are typically (but not necessarily) identical to the right-side branch lines and sub-branch lines of the first barrier assembly 12a, and are not fully illustrated for simplicity. (The left-side branch lines (and sub-branch lines) of the first barrier assembly 12a may be omitted if main trunk line 16a is to be the leftmost end of the barrier.) Typically (but not necessarily), the left-side and right-side branch and sub-branch lines of a given barrier assembly will be identical. The branch lines 20a typically begin near the top end of the main trunk line 16a (i.e., near the balloon 14a) and extend lower at regular intervals until they reach a point at or near the connection between the main trunk line and the securing device, 18a. Each branch line 20a is affixed to the main trunk line 16a at a connection point 22a. This connection point could be integral to the main trunk line as depicted or could be affixed with a clamp or simply by tying the branch line to the main trunk line. Each branch line 20a may be permanently affixed to the main trunk line 16a, or may be removably affixed to the main trunk line 16a such as via a hook on one side and a ring on the other side (or any other suitable mechanism for removable affixation including the simple tying of the branch line to the trunk line). The branch lines 20a should be spaced close enough together for it to be unlikely that a drone could pass through the barrier, but far enough apart to provide the desired overall height of the barrier. In one exemplary embodiment of the invention, the branch lines 20a are spaced about eighteen inches apart.

Similarly, the second barrier assembly 12b further comprises one or more (three are illustrated) branch lines 20b affixed to the left side of the main trunk line 16b in a spaced-apart configuration and one or more (three are illustrated) branch lines 20a affixed to the right side of the main trunk line 16a in a spaced-apart configuration. The left-side branch lines (and sub-branch lines, described below) of the second barrier assembly 12b are typically (but not necessarily) identical to the right-side branch lines and sub-branch lines of the second barrier assembly 12b, and are not fully illustrated for simplicity. (The right-side branch lines (and sub-branch lines) of the second barrier assembly 12b may be omitted if main trunk line 16b is to be the rightmost end of the barrier.) The branch lines 20b are typically located near the top end of the main trunk line 16b (i.e., near the balloon 14b) and extend lower at regular intervals until they reach a point at or near the connection between the main trunk line and the securing device, 18b. (The branch lines should be affixed or affixable to each respective main trunk line at similar locations such that the branch lines attached to respective adjacent main trunk lines are properly aligned when the branch lines are connected as described below.) Each branch line 20b is affixed to the main trunk line 16b at a connection point 22b. This connection point could be integral to the main trunk line as depicted or could be affixed with a clamp or simply by tying the branch line to the main trunk line. Each branch line 20b may be permanently affixed to the main trunk line 16b, or may be removably affixed to the main trunk line 16b such as via a hook on one side and a ring on the other side (or any other suitable mechanism for removable affixation including the simple tying of the branch line to the trunk line). The branch lines 20*b* should be spaced close enough together for it to be unlikely that a drone could pass through the barrier, but far enough apart to provide the desired overall height of the barrier. In one exemplary embodiment of the invention, the branch lines 20*b* are spaced about eighteen inches apart.

The branch lines 20*a*, 20*b* may be constructed of any elongated material, such as wire, cable, rope, etc., that is durable, flexible, strong enough to withstand the tension as the trunk lines move and support the sub-branch lines (described below) and to withstand the impact of a drone, yet light enough to be held aloft by the balloons (along with the other components). The material may be braided or monofilament, or any other suitable construction that provides the desired strength-to-weight ratio. The branch lines 20*a*, 20*b* do not need to be a strong as the trunk lines 16*a*, 16*b*, so the branch lines 20*a*, 20*b* will typically be thinner and lighter than the trunk lines 16*a*, 16*b*. The branch lines 20*a*, 20*b* may be of any suitable, desired length. In one exemplary embodiment of the invention, the branch lines 20*a*, 20*b* are about ten feet long. The placement of the trunk lines 16*a*, 16*b* (i.e., the distance apart) is based on the length of the branch lines 20*a*, 20*b* (so the trunk lines 16*a*, 16*b* would be about twenty feet apart in such an exemplary embodiment).

To assemble the drone barrier system 10 illustrated in FIG. 1, the distal end of one right-side branch line 20*a* of the first assembly 12*a* is affixed to the distal end of a corresponding left-side branch line 20*b* of the second assembly 12*b* at connection point 24. The affixation of the distal ends is performed for each pair of corresponding branch lines from the right-side of the first assembly 12*a* and the left-side of the second assembly 12*b*. The distal ends of the corresponding branch lines 20*a*, 20*b* are removably affixed, such as via a hook on one side and a ring on the other side (or any other suitable mechanism for removable affixation including by means of a simple clamp or simply tying the two distal ends together), such that the barrier system 10 comprising any desired number of assemblies 12*a*, 12*b* can be readily assembled and disassembled as needed.

Any desired number of barrier assemblies may be assembled together. For example, a third barrier assembly (not illustrated) may be connected to the first barrier assembly 12*a* on the opposite side from the second barrier assembly 12*b*. To connect such a third barrier assembly, the right-side branch lines of the third assembly are affixed to the corresponding left-side branch lines 20*a* of the first assembly 12*a*. Similarly, a fourth barrier assembly (not illustrated) may be connected to the second barrier assembly 12*b* on the opposite side from the first barrier assembly 12*a*. To connect such a fourth barrier assembly, the left-side branch lines of the fourth assembly are affixed to the corresponding right-side branch lines 20*a* of the second assembly 12*b*. Many more additional barrier assemblies may be connected together as described to form a barrier system of a desired length. For the two barrier assemblies on the opposing ends of the completed barrier system, the branch lines that are not affixed to an adjacent assembly's branch lines may simply hang down. Alternatively, if the branch lines are removably affixed to the trunk lines, the branch lines that are not affixed to an adjacent assembly's branch lines may be removed.

The first barrier assembly 12*a* may further comprise one or more (six are illustrated) complete sub-branch lines 26*a* and/or one or more partial sub-branch lines 28*a*. Each complete sub-branch line 26*a* is affixed (permanently or removably) at opposing ends to adjacent branch lines 20*a*, and together with the branch lines 20*a* form a grid and help maintain the spacing between the branch lines 20*a*. Because the complete sub-branch lines are affixed at opposing ends to adjacent branch lines, the complete sub-branch lines may also be termed "connecting lines." Each partial sub-branch line 28*a* is affixed (permanently or removably) at one end to a corresponding branch line, such that the opposing end is free and the partial sub-branch line 28*a* swings freely. Because the partial sub-branch lines are affixed at only one end to a corresponding branch line, the partial sub-branch lines may also be termed "hanging lines."

Similarly, the second barrier assembly 12*b* may further comprise one or more (six are illustrated) complete sub-branch lines 26*b* and/or one or more partial sub-branch lines 28*b*. Each complete sub-branch line 26*b* is affixed (permanently or removably) at opposing ends to adjacent branch lines 20*b*, and together with the branch lines 20*b* form a grid and help maintain the spacing between the branch lines 20*b*. Each partial sub-branch line 28*b* is affixed (permanently or removably) at one end to a corresponding branch line, such that the opposing end is free and the partial sub-branch line 28*b* swings freely.

Each grid formed by the branch lines and the complete sub-branch lines and main trunk lines will typically have at least one and typically more than one partial sub-branch line positioned within the grid. In FIG. 1, most of the grids have one partial sub-branch line each and two of the grids have three sub-branch lines each. Any suitable number of partial sub-branch lines may be positioned within each grid, with any suitable spacing. Additionally, as shown in FIG. 1, one ore more partial sub-branch lines 30*a*, 30*b* may hang down from the bottommost branch line (such that they may not technically be positioned within a grid).

It is contemplated the partial sub-branch lines would be extremely light weight but high modulus (such as monofilament) such that they would entangle drone rotors either through gravity or by being pulled into the drone rotors through updraft (one of the partial sub-branch lines 28*a* is shown pulled upward as if by updraft). The complete sub-branch line 26*a*, 26*b* and the partial sub-branch lines 28*a*, 28*b* may be constructed of any elongated material, such as wire, cable, rope, etc., that is durable, flexible, strong enough to withstand the tension as the branch lines move and to withstand the impact of a drone, yet light enough to be held aloft by the balloons (along with the other components). The material may be braided or monofilament, or any other suitable construction that provides the desired strength-to-weight ratio. The complete and partial sub-branch lines 26*a*, 26*b*, 28*a*, 28*b* do not need to be a strong as the branch lines 20*a*, 20*b*, so the complete and partial sub-branch lines 26*a*, 26*b*, 28*a*, 28*b* will typically be thinner and lighter than the branch lines 20*a*, 20*b*.

In alternative embodiments of the invention, the complete sub-branch lines 26*a*, 26*b* may be constructed of a rigid or semi-rigid material to help maintain the spacing between the branch lines 20*a*, 20*b*.

The complete sub-branch lines 26*a*, 26*b* should be spaced close enough together for it to be unlikely that a drone could pass through the barrier. In one exemplary embodiment of the invention, the complete sub-branch lines 26*a*, 26*b* are spaced about eighteen inches apart. The partial sub-branch lines 28*a*, 28*b* may be of any suitable, desired length. In one exemplary embodiment of the invention, the partial sub-branch lines 28*a*, 28*b* are about ten inches long. The length of the complete sub-branch lines 26*a*, 26*b* is based on the spacing of the branch lines 20*a*, 20*b*. The partial sub-branch lines may be all uniform in length, or may be of variable length. In FIG. 1, most of the partial sub-branch lines are the same length, but two of the grids are shown with three sub-branch lines each (including partial sub-branch lines 32a, 32b that are long enough to reach or nearly reach the next lower branch line).

The free-swinging partial sub-branch lines 28a, 28b provide a potential entanglement for any drone that flies too close to the barrier. The free ends of a partial sub-branch line 28a, 28b can be caught in a drone's updraft (this is illustrated in FIG. 1 in the top right partial sub-branch 28a of the first assembly 12a) and advantageously become entangled in one or more of the drone's rotors, thereby potentially disabling the drone.

After the distal ends of the corresponding branch lines 20a, 20b are affixed as described above, the balloons 14, 14b are inflated with a helium or hydrogen. The inflated balloons will rise to a height permitted by the length of the main trunk lines 16a, 16b, and assume a generally upright orientation (although wind will often move the balloons 14a, 14b and tilt the main trunk lines 16a, 16b. The affixed branch lines 20a, 20b will span between the main trunk lines 16a, 16b and assume a generally horizontal orientation. In this regard, the top portion of the main trunk lines 16a, 16b (i.e., the portion to which the branch lines are attached), the branch lines 20a, 20b, and the complete sub-branch lines 26a, 26b form a substantially upright grid suspended a desired height in the air to form a barrier to a drone that might directly contact one or more of the main trunk lines 16a, 16b, the branch liens 20a, 20b, and/or the complete sub-branch lines 26a, 26b, or may become entangled by one or more of the partial sub-branch lines 28a, 28b, 30a, 30b, 32a, 32b. Further, wind, convection or other environmental conditions may disperse the sub-branch lines in a broader area, increasingly the likelihood of drone entanglement.

In one exemplary embodiment of the invention, the trunk lines, branch lines, and complete sub-branch lines are made from AmSteel Blue rope from Samson Rope Technologies, Inc. which is made of Dyneema ultra-high-molecular-weight polyethylene (UHMWPE). The trunk is 5/32" diameter with a 4000 pound (lb.) average strength, and the branches are 7/64" diameter with a 1600 lb. average strength. The partial sub-branch lines are made of 25 lb. monofilament fishing line from Ande, Inc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

That which is claimed:

1. A portable aerial drone barrier system, comprising (a) at least two adjacent barrier assemblies, each barrier assembly being separately packaged and including (1) a flexible trunk line having a ground-anchorable end and an opposite end; (2) at least two flexible first branch lines each having a proximal end detachably connected with said trunk line in a spaced-apart configuration and a distal end; (3) at least two flexible first connecting lines extending between a pair of spaced flexible first branch lines, each flexible first connecting line having opposite ends connected with said flexible first branch lines, respectively, in a spaced-apart configuration to define an open grid; (b) an inflatable balloon detachably connected with said trunk line opposite end of each barrier assembly; and (c) a detachable connection device connected with each of said distal ends of corresponding flexible first branch lines of adjacent barrier assemblies, respectively, to selectively join a plurality of barrier assemblies together to form an aerial drone barrier, an overall weight and an unassembled size of the system being configured to enable the system to be man-portable, whereby when said at least two barrier assemblies are connected via said detachable connection devices, when said trunk line of each barrier assembly is anchored to the ground, and when said balloons are inflated with lighter-than-air gas, an upper edge of the aerial drone barrier is raised in the air to intercept or entangle an aerial drone.

2. The portable aerial drone barrier system as defined in claim 1, wherein each assembly further comprises (a) at least two flexible second branch lines each having a proximal end detachably connected with said trunk line opposite a corresponding flexible first branch line proximal end; and (b) at least two flexible second connecting lines extending between a pair of spaced flexible second branch lines, each flexible second connecting line having opposite ends connected with said flexible second branch lines in a spaced-apart configuration.

3. The portable aerial drone barrier system as defined in claim 2, and further comprising a plurality of flexible hanging lines, each flexible hanging line having a first end connected with a respective flexible first or second branch line and an opposite free end, said free ends of said hanging lines swinging freely in three dimensions relative to said open grid in response to wind and updrafts in proximity to the barrier.

4. The portable aerial drone barrier system of claim 3, wherein said flexible hanging lines have different lengths.

5. A method for creating a portable barrier to an aerial drone, comprising the steps of (a) providing a system including at least two separately packaged barrier assemblies, the system having an overall weight and a size to enable the system to be man-portable, each open grid barrier assembly including (1) a flexible trunk line having a ground-anchorable end and an opposite end; (2) at least two flexible branch lines each having a proximal end detachably connected with said trunk line in a spaced-apart configuration and a distal end; and (3) at least two flexible connecting lines extending between a pair of spaced flexible branch lines, each flexible connecting line having opposite ends connected with said flexible first branch lines in a spaced-apart configuration; (b) affixing at least two of said open grid barrier assemblies together with detachable connection devices at said distal ends of corresponding first branch lines of adjacent open grid barrier assemblies, respectively; (c) anchoring the ground-anchorable end of each open grid barrier assembly trunk line to the ground; (d) affixing an inflatable balloon to the opposite end of each barrier assembly trunk line; and (e) inflating said balloons of each open grid barrier assembly with lighter-than-air gas to raise an upper edge of the barrier assembly to form a substantially upright grid suspended in the air to intercept an aerial drone.

6. A man portable aerial drone barrier, comprising at least two separately packaged assemblies, an overall weight and unassembled size of each assembly configured to be man-portable, each assembly comprising an open grid including (a) a flexible trunk line having a ground-anchorable end and an opposite end; (b) an inflatable balloon detachably connected with said trunk line opposite end; (c) at least two flexible first branch lines each having a proximal end detachably connected with said trunk line in a spaced-apart configuration and a distal end; (d) a detachable connection device connected with each of said distal ends of corresponding flexible first branch lines of adjacent assemblies, respectively, to selectively join said at least two assemblies together to form the aerial drone barrier; (e) at least two flexible first connecting lines extending between a pair of spaced flexible first branch lines, each flexible first connecting line having opposite ends connected with said flexible first branch lines, respectively, in a spaced-apart configuration; (f) at least two flexible second branch lines each having a proximal end detachably connected with said trunk line in a spaced-apart configuration opposite a corresponding flexible first branch line proximal end and a distal end; (g) at least two flexible second connecting lines extending between a pair of spaced flexible second branch lines, each flexible second connecting line having opposite ends connected with said flexible second branch lines, respectively, in a spaced-apart configuration; and (h) a plurality of flexible hanging lines, each flexible hanging line having a first end connected with a respective flexible first or second branch line and an opposite free end, whereby when said at least two assemblies are connected via said detachable connection devices, said trunk line of each assembly is anchored to the ground and said balloon of each assembly is inflated with lighter-than-air gas, an upper edge of the barrier is raised in the air by the balloons and said free ends of said hanging lines swinging freely in three dimensions relative to said grid in response to wind and updrafts in proximity to the barrier.

\* \* \* \* \*